(No Model.)

O. B. SHALLENBERGER.
JOURNAL BEARING.

No. 499,334. Patented June 13, 1893.

Witnesses
James W. Smith.
James Mark Barr.

Inventor
Oliver B. Shallenberger
By his Attorney
Charles A. Terry

United States Patent Office.

OLIVER B. SHALLENBERGER, OF ROCHESTER, ASSIGNOR TO THE WESTINGHOUSE ELECTRIC COMPANY, OF PITTSBURG, PENNSYLVANIA.

JOURNAL-BEARING.

SPECIFICATION forming part of Letters Patent No. 499,334, dated June 13, 1893.

Application filed November 23, 1889. Serial No. 331,331. (No model.)

*To all whom it may concern:*

Be it known that I, OLIVER B. SHALLENBERGER, a citizen of the United States, residing at Rochester, in the county of Beaver and State of Pennsylvania, have invented certain new and useful Improvements in Journal-Bearings, (Case No. 360,) of which the following is a specification.

The invention relates to the construction of bearings for shafts and journals, and especially for shafts which require to be supported in such manner that they may turn with little friction.

The invention is especially adapted to a form of electric meter for alternating currents described in certain patents issued to me, Nos. 388,003 and 388,004, dated August 14, 1888.

The invention has for its further object, the preventing of the wearing away of the bearing upon which the journal normally rests, the latter being usually placed in a vertical position.

The invention consists in providing a jewel with a concave surface in which the journal is stepped, covering this with a suitable lubricating oil and inclosing it with a case having an overhanging flange, which will prevent the oil from escaping in case the bearing is turned upon its side or inverted.

The invention further consists in forming the bearing surface of the shaft convex with a radius of curvature less than that of the concave surface of the jewel. This insures a very low degree of friction.

The invention will be described in detail in connection with the accompanying drawings, in which—

Figure 1:
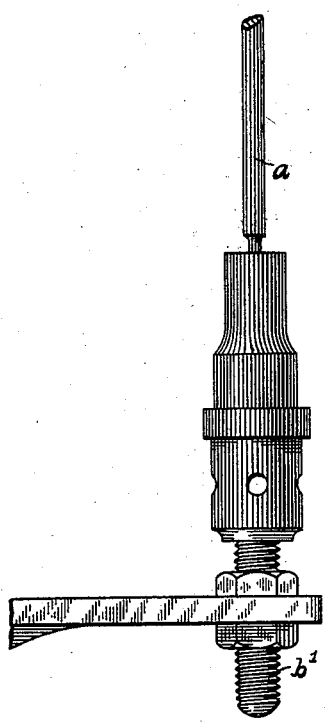
Figure 2:
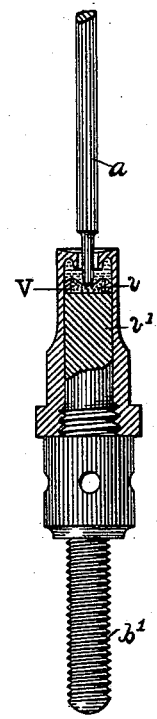

Figure 1 is an elevation of a journal and its bearing, and Fig. 2 is a side elevation, partly in section, of the bearing.

Referring to the figures, $a$ represents the shaft, the end of which may be rounded and of hardened steel, and $v$ represents the jewel in which it rests. This jewel is concave as represented in Fig. 2 and is stepped in the end of a support $v'$ placed in a cup V. The bearing end of the shaft is rounded in such manner as to reduce the extent of bearing surface. If the shaft is pointed it is very liable to drill into the jewel, and if it were curved to fit exactly the surface of the jewel, the friction would be great. The curve of the convex end of the shaft is therefore of less radius than that of the concave of the jewel. The support may be adjusted vertically in the cup by means of the screw-thread as shown in Fig. 2. The upper end of the cup is turned inward and downward, leaving sufficient space for the shaft $a$ to pass through without touching. Within the cup there is placed a small quantity of oil or other lubricating substance, which will prevent the shaft and jewel from wearing each other. The peculiar form of the cup prevents the oil from escaping in whatever position the journal may chance to be carried, during transportation, for instance.

The bearing may be supported in a suitable frame by means of an adjustable screw $b'$ so that the shaft may be adjusted in any required position.

I claim as my invention—

1. The combination, with a vertical shaft having its lower end convex, of a lower bearing for the shaft consisting of a jewel having a vertically curved concave bearing surface having a greater radius of curvature than that of the end of the shaft, and a lubricating cup containing the jewel having its upper edge drawn inward and projecting downward from the shaft substantially as described.

2. The combination with a vertical shaft having its lower end convex and vertically curved, of a vertically curved concave step therefor the radius of curvature of which is greater than that of the end of said shaft, substantially as described.

In testimony whereof I have hereunto subscribed my name this 11th day of November, A. D. 1889.

OLIVER B. SHALLENBERGER.

Witnesses:
SAML. R. ROSEMAND,
JAMES W. SMITH.